(12) United States Patent
Bi et al.

(10) Patent No.: US 12,222,431 B2
(45) Date of Patent: Feb. 11, 2025

(54) POSITIONING INFORMATION PROCESSING METHOD AND APPARATUS, AND STORAGE MEDIUM

(71) Applicant: ZTE CORPORATION, Shenzhen (CN)

(72) Inventors: Cheng Bi, Shenzhen (CN); Chuangxin Jiang, Shenzhen (CN); Zhaohua Lu, Shenzhen (CN); Huahua Xiao, Shenzhen (CN); Guozeng Zheng, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 350 days.

(21) Appl. No.: 17/904,126

(22) PCT Filed: Jan. 28, 2021

(86) PCT No.: PCT/CN2021/074059
§ 371 (c)(1),
(2) Date: Aug. 12, 2022

(87) PCT Pub. No.: WO2021/159959
PCT Pub. Date: Aug. 19, 2021

(65) Prior Publication Data
US 2023/0067678 A1 Mar. 2, 2023

(30) Foreign Application Priority Data
Feb. 13, 2020 (CN) .......................... 202010091506.3

(51) Int. Cl.
*G01S 5/00* (2006.01)
*H04L 5/00* (2006.01)
*H04W 24/10* (2009.01)

(52) U.S. Cl.
CPC .......... *G01S 5/0063* (2013.01); *H04L 5/0051* (2013.01); *H04W 24/10* (2013.01)

(58) Field of Classification Search
None
See application file for complete search history.

(56) References Cited

U.S. PATENT DOCUMENTS

2020/0137715 A1 4/2020 Edge et al.
2023/0053304 A1* 2/2023 Thomas ................ G01S 13/878
(Continued)

FOREIGN PATENT DOCUMENTS

CN 110536231 A 12/2019
CN 111586831 A 8/2020
(Continued)

OTHER PUBLICATIONS

3GPP Technical Specification Group Radio Access Network. "Considerations on UL procedures for NR positioning," 3GPP TSG-RAN WG2 Meeting #108, Nov. 2019, pp. 1-8.
(Continued)

*Primary Examiner* — Adolf Dsouza
(74) *Attorney, Agent, or Firm* — Vivacqua Crane, PLLC (57) ABSTRACT

A method and apparatus for processing location information and a non-transitory computer-readable storage medium are disclosed. The method may include: transmitting, by a location management function (LMF) server, location request information to a serving cell of a terminal device, the location request information at least comprising sounding reference signal (SRS) configuration recommendation information; receiving, by the LMF server, location response information transmitted by the serving cell, the location response information at least comprising SRS configuration determination information; and transmitting, by the LMF server, measurement request information to a transmission
(Continued)

receive point (TRP), the measurement request information comprising the SRS configuration determination information.

19 Claims, 5 Drawing Sheets

(56) References Cited

U.S. PATENT DOCUMENTS

2023/0067678 A1* 3/2023 Bi .................. H04W 24/10
2023/0344589 A1* 10/2023 Shreevastav .......... H04L 5/0023

FOREIGN PATENT DOCUMENTS

| CN | 111901809 A | 11/2020 |
| EP | 3923644 A1 | 12/2021 |
| EP | 3874844 B1 | 11/2023 |

OTHER PUBLICATIONS

3GPP Technical Specification Group Radio Access Network. "Stage 2 for Multi-RTT positioning," 3GPP TSG-RAN WG2 Meeting #108, Nov. 2019, pp. 1-19.

Intellectual Property India. Examination Report for IN Application No. 202227051980 and English translation, mailed Jan. 19, 2023, pp. 1-7.

Japan Patent Office. Notice of Reasons for Refusal for JP Application No. 2022-532667 and English translation, mailed Jun. 29, 2023, pp. 1-6.

3GPP Technical Specification Group Radio Access Network. "Aspects of UL-based NR positioning techniques," 3GPP TSG RAN WG1 NR Meeting, Jan. 21-25, 2019, pp. 1-8.

3GPP Technical Specification Group Radio Access Network. "NR RAT-dependent UL Positioning," 3GPP TSG RAN WG1 Ad-Hoc Meeting, Jan. 21-25, 2017, pp. 1-10.

International Searching Authority. International Search Report and Written Opinion for PCT Application No. PCT/CN2021/074059 and English translation, mailed Apr. 28, 2021, pp. 1-10.

3GPP Technical Specification Group Radio Access Network. "Discussion on UL Reference Signals for NR Positioning," 3GPP TSG RAN WG1 Meeting #99, Nov. 2019, pp. 1-5.

3GPP Technical Specification Group Radio Access Network. "DL and UL NR Positioning Procedures," 3GPP TSG-RAN WG2 Meeting #106, May 2019, pp. 1-8.

European Patent Office. Extended European Search Report for EP Application No. 21754394.1, mailed Mar. 1, 2024, pp. 1-11.

Intellectual Property India. Hearing Notice for IN Application No. 202227051980 and English translation, mailed Mar. 15, 2024, pp. 1-2.

* cited by examiner

POSITIONING INFORMATION PROCESSING METHOD AND APPARATUS, AND STORAGE MEDIUM

CROSS-REFERENCE TO RELATED APPLICATION

This application is a national stage filing under 35 U.S.C. § 371 of international application number PCT/CN2021/074059, filed Jan. 28, 2021, which claims priority to Chinese patent application No. 202010091506.3, filed on Feb. 13, 2020. The contents of these applications are incorporated herein by reference in their entirety.

TECHNICAL FIELD

The present disclosure relates to the field of wireless communication networks, in particular, to a method and apparatus for processing location information and a non-transitory computer-readable storage medium.

BACKGROUND

In new radio access technology (NR) systems, Sounding Reference Signals (SRSs) are endowed with a new location function. When SRSs are used for locating, the SRS of a terminal device needs to be detected by a plurality of transmission receive points (TRPs). There's a desire to propose a cooperative operation mechanism between the serving cell of the terminal device and the TRPs.

SUMMARY

The present disclosure provides a method and apparatus for processing location information and a non-transitory computer-readable storage medium, which enables the cooperation between a serving cell of a terminal device and a TRP during the SRS configuration and activation of the terminal device.

According to an embodiment of the present disclosure, provided is a method for processing location information, which may include: transmitting, by a location management function (LMF) server, location request information to a serving cell of a terminal device, the location request information at least including SRS configuration recommendation information; receiving, by the LMF server, location response information transmitted by the serving cell, the location response information at least including SRS configuration determination information; and, transmitting, by the LMF server, measurement request information to a TRP, the measurement request information including the SRS configuration determination information.

According to an embodiment of the present disclosure, provided is a method for processing location information, which may include: receiving, by a serving cell of a terminal device, location request information transmitted by an LMF server, the location request information at least including SRS configuration recommendation information; and, transmitting, by the serving cell, location response information to the LMF server, the location response information at least including SRS configuration determination information.

According to an embodiment of the present disclosure, provided is an apparatus for processing location information, which may include: a processor configured to perform the method described in any one of the above embodiments when executing computer programs.

According to an embodiment of the present disclosure, further provided is a non-transitory computer-readable storage medium storing computer programs which, when executed by a processor, cause the processor to perform the method described in any one of the above embodiments.

DETAILED DESCRIPTION

The embodiments of the present disclosure will be described below with reference to the accompanying drawings.

In the NR standard Release-16 (R-16), SRSs are endowed with a new location function. To improve the process of using a semi-persistent/aperiodic SRS for locating, the semi-persistent/aperiodic SRS used for locating is different from SRSs used for other purposes, and the SRS of a terminal device needs to be detected by a plurality of TRPs. If the serving cell of the terminal device activates the semi-persistent/aperiodic SRS of the terminal device without notifying the TRPs that need to detect the SRS signal of the terminal device in the same locating process, it is possible that adjacent TRPs cannot detect the SRS signal in time. It's desired to propose a cooperative operation mechanism between the serving cell of the terminal device and the TRPs.

An embodiment of the present disclosure provides a mobile communication network (including but not limited to 5th-Generation mobile communication networks (5G)). A network architecture of this network may include network-side devices (e.g., one or more types of base stations, transmission nodes, Access Points (APs), relays, Node B (NB), Universal Terrestrial Radio Access (UTRA), Evolved Universal Terrestrial Radio Access (EUTRA), etc.) and terminal devices (User Equipments (UEs), user equipment data cards, relay mobile devices, etc.). In the embodiments of the present disclosure, a method and apparatus for processing location information and a storage medium are provided, which can operate on the network architecture and can realize the cooperation between a serving cell of a terminal device and a TRP during the SRS configuration and activation of the terminal device.

The method and apparatus for processing location information and the technical effects will be described below. In an embodiment, the serving cell of the terminal device mentioned in the following embodiments may also be referred to as a serving base station of the terminal device or a serving node of the terminal device.

Figure 1:
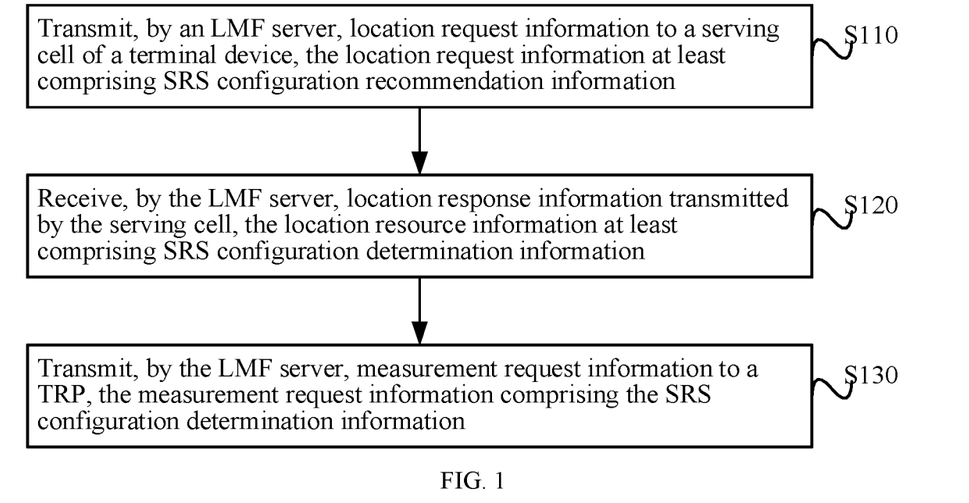
FIG. 1 is a flowchart of a method for processing location information according to an embodiment.

FIG. 1 is a flowchart of a method for processing location information according to an embodiment. As shown in FIG. 1, the method in the embodiment is applicable to a location management function (LMF) server. The method includes steps S110 to S130.

At S110, an LMF server transmits location request information to a serving cell of a terminal device, where the location request information at least includes SRS configuration recommendation information.

In an embodiment, the location request is initiated by the terminal device, and the serving cell where the LMF initiates the location request is just the serving cell of the terminal device (also referred to as the target terminal device) that initiates the location request.

In an embodiment, the SRS configuration recommendation information includes at least one of a recommended SRS configuration type, a recommended SRS time domain type, a recommended SRS minimum bandwidth, a recommended SRS frequency domain position, a recommended SRS period, a recommended SRS scramble Identifier (ID), a recommended SRS transmission comb size, a recommended SRS cyclic shift, and a recommended SRS transmission port number.

In an embodiment, the recommended SRS time domain type may be periodic transmission, aperiodic transmission or semi-persistent transmission.

At S120, the LMF server receives location response information transmitted by the serving cell, where the location response information at least includes SRS configuration determination information.

In an embodiment, the SRS configuration determination information includes at least one of an actually configured SRS configuration type, an actually configured SRS time domain type, an actually configured SRS bandwidth, an actually configured SRS frequency domain position, an actually configured SRS time domain position, an actually configured SRS period, an actually configured SRS scramble ID, an actually configured SRS transmission comb size, an actually configured SRS cyclic shift, and an actually configured SRS transmission port number.

In an embodiment, the actually configured SRS time domain type may be periodic transmission, aperiodic transmission and semi-persistent transmission.

In an embodiment, the SRS configuration determination information is identical to the SRS configuration recommendation information, or the SRS configuration determination information is different from the SRS configuration recommendation information. For example, the recommended SRS time domain type is aperiodic transmission, while the actually configured SRS time domain type is periodic transmission. In other words, the SRS configuration determination information is different from the SRS configuration recommendation information.

At S130, the LMF server transmits measurement request information to a TRP, where the measurement request information includes the SRS configuration determination information.

In an embodiment, when the actually configured SRS time domain type is periodic transmission, at S130, the LMF server transmits the measurement request information to the TRP, so that the TRP performs SRS detection at a fixed position.

In an embodiment, when the actually configured SRS time domain type is aperiodic transmission, at S130, the LMF server transmits the measurement request information to the TRP, so that the TRP performs SRS detection at the time domain position of the aperiodically transmitted SRS.

In an embodiment, when the actually configured SRS time domain type is semi-persistent transmission, step S130 includes: transmitting, by the LMF server, the measurement request information to the TRP; receiving, by the LMF server, semi-persistent SRS activation information transmitted by the serving cell; and, transmitting, by the LMF server, the semi-persistent SRS activation information to the TRP, so that the TRP performs SRS detection at the time domain position of the semi-persistently transmitted SRS.

The LMF server may also receive semi-persistent SRS deactivation information transmitted by the serving cell and transmit the semi-persistent SRS deactivation information to the TRP.

Figure 2:
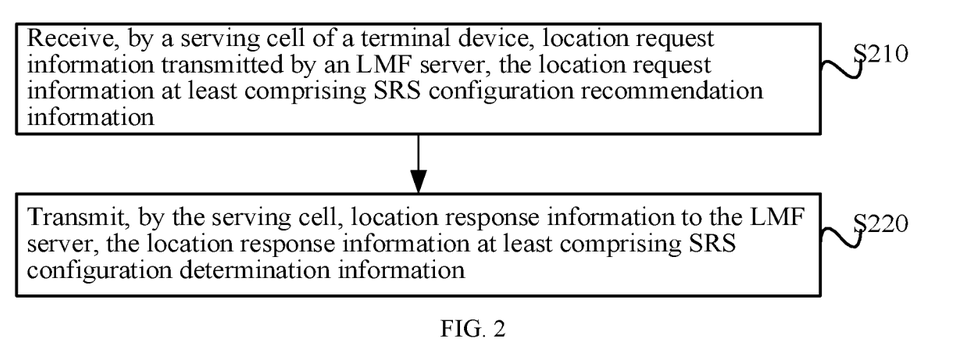
FIG. 2 is a flowchart of another method for processing location information according to an embodiment.

FIG. 2 is a flowchart of another method for processing location information according to an embodiment. As shown in FIG. 2, the method in the embodiment is applicable to a serving cell of a terminal device. The method includes steps S210 to S220.

At S210, a serving cell of a terminal device receives location request information transmitted by an LMF server, where the location request information at least includes SRS configuration recommendation information.

In an embodiment, the SRS configuration recommendation information includes at least one of a recommended SRS configuration type, a recommended SRS time domain type, a recommended SRS minimum bandwidth, a recommended SRS frequency domain position, a recommended SRS period, recommended SRS scramble ID, a recommended SRS transmission comb size, a recommended SRS cyclic shift, and a recommended SRS transmission port number.

In an embodiment, the recommended SRS time domain type may be periodic transmission, aperiodic transmission and semi-persistent transmission.

In an embodiment, after S210 is executed, the method further includes:

determining, by the serving cell, the SRS configuration determination information according to a configurable resource state of the serving cell and the SRS configuration recommendation information.

In an embodiment, the SRS configuration determination information includes at least one of an actually configured SRS configuration type, an actually configured SRS time domain type, an actually configured SRS bandwidth, an actually configured SRS frequency domain position, an actually configured SRS time domain position, an actually configured SRS period, an actually configured SRS scramble ID, an actually configured SRS transmission comb size, an actually configured SRS cyclic shift, and an actually configured SRS transmission port number.

In an embodiment, the actually configured SRS time domain type may be periodic transmission, aperiodic transmission and semi-persistent transmission.

In an embodiment, the SRS configuration determination information is identical to the SRS configuration recommendation information, or the SRS configuration determination information is different from the SRS configuration recommendation information. For example, the recommended SRS time domain type is periodic transmission, and the actually configured SRS time-domain type is also periodic transmission. In other words, the SRS configuration determination information is identical to the SRS configuration recommendation information.

At S220, the serving cell transmits location response information to the LMF server, where the location response information at least includes SRS configuration determination information.

In an embodiment, when the actually configured SRS time domain type is aperiodic transmission, the serving cell may also activate the aperiodically transmitted SRS.

In an embodiment, when the actually configured SRS time domain type is semi-persistent transmission, the serving cell may also activate the semi-persistently transmitted SRS and transmit semi-persistent SRS activation information to the LMF server.

The serving cell may also deactivate the semi-persistently transmitted SRS and transmit semi-persistent SRS deactivation information to the LMF server.

Some implementations will be listed below to explain the method for processing location information according to the embodiments of the present disclosure, and the following implementations may be executed separately or in combination. The description will be given by taking the terminal device that initiates the location request being a target UE as an example.

Figure 3:
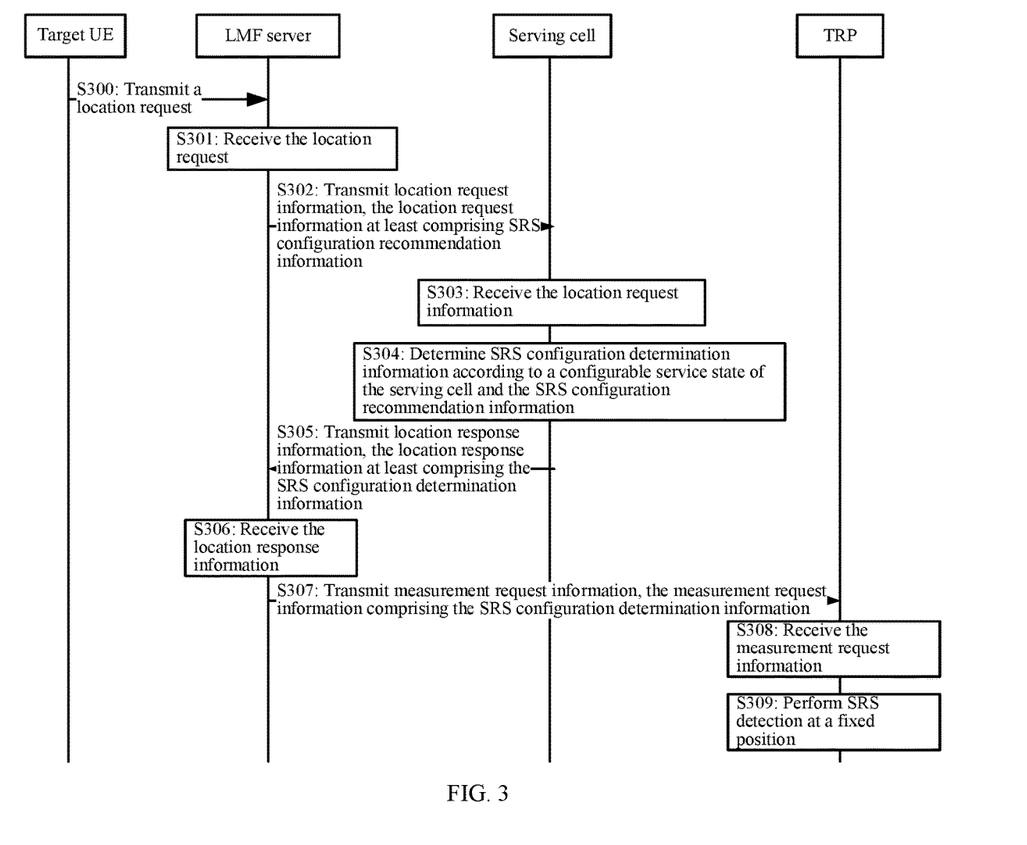
FIG. 3 is an interaction flowchart of a method for processing location information according to an embodiment.

In an implementation, the actually configured SRS time domain type is periodic transmission. FIG. 3 is an interaction flowchart of a method for processing location information according to an embodiment. As shown in FIG. 3, the method includes steps S300 to S309.

At S300, a target UE transmits a location request to an LMF server.

At S310, the LMF server receives the location request transmitted by the target UE.

At S302, the LMF server transmits location request information to a serving cell of the target UE (hereafter referred to as the serving cell), where the location request information at least includes SRS configuration recommendation information.

The SRS configuration recommendation information may be obtained by the LMF server according to the location request of the target UE.

At S303, the serving cell receives the location request information transmitted by the LMF server.

At S304, the serving cell determines SRS configuration determination information according to a configurable resource state of the serving cell and the SRS configuration recommendation information.

As an example, the recommended SRS time domain type includes aperiodic transmission and periodic transmission, and the serving cell determines according to the configurable resource state of the serving cell and the SRS configuration recommendation information that the actually configured SRS time domain type is periodic transmission.

At S305, the serving cell transmits location response information to the LMF server, where the location response information at least includes the SRS configuration determination information.

At S306, the LMF server receives the location response information transmitted by the serving cell.

At S307, the LMF server transmits measurement request information to a TRP, where the measurement request information includes the SRS configuration determination information.

At S308, the TRP receives the measurement request information transmitted by the LMF server.

At S309, the TRP performs SRS detection at a fixed position.

Figure 4:
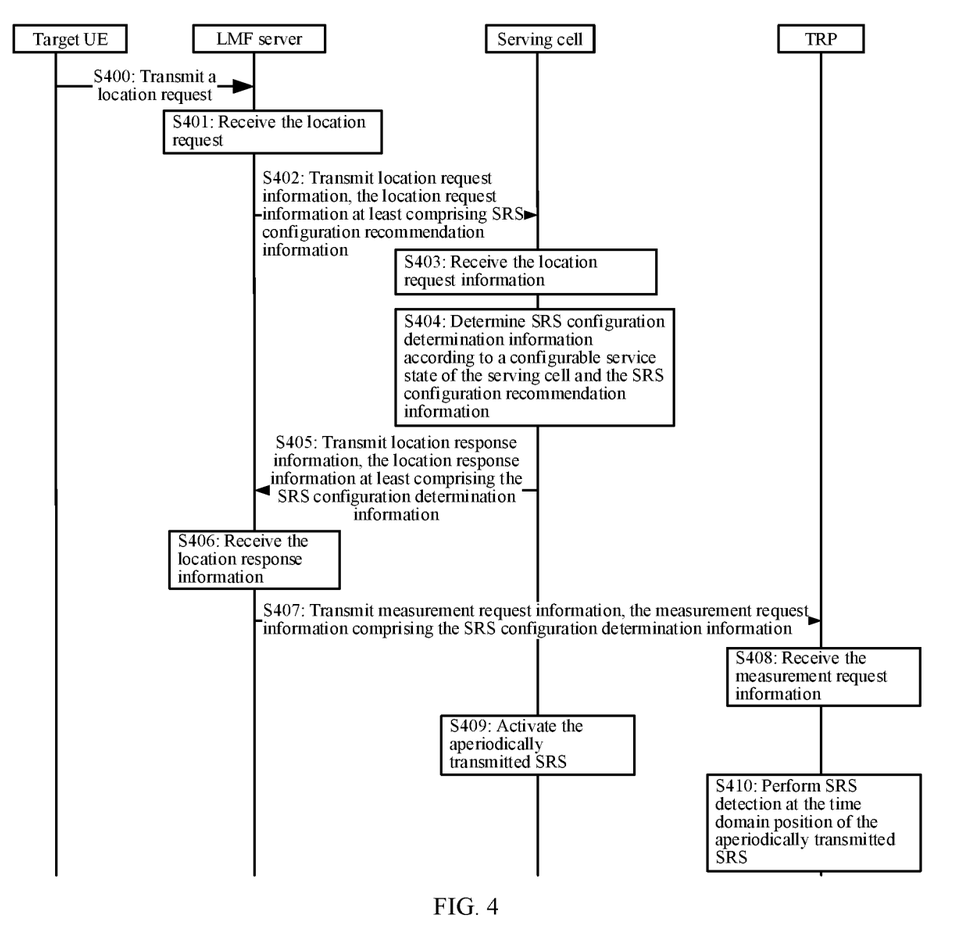
FIG. 4 is an interaction flowchart of another method for processing location information according to an embodiment.

In another implementation, the actually configured SRS time domain type is aperiodic transmission. FIG. 4 is an interaction flowchart of another method for processing location information according to an embodiment. As shown in FIG. 4, the method includes steps S400 to S410.

At S400, a target UE transmits a location request to an LMF server.

At S401, the LMF server receives the location request transmitted by the target UE.

At S402, the LMF server transmits location request information to a serving cell of the target UE (hereafter referred to as the serving cell), where the location request information at least includes SRS configuration recommendation information.

The SRS configuration recommendation information may be obtained by the LMF server according to the location request of the target UE.

At S403, the serving cell receives the location request information transmitted by the LMF server.

At S404, the serving cell determines SRS configuration determination information according to a configurable resource state of the serving cell and the SRS configuration recommendation information.

As an example, the recommended SRS time domain type is aperiodic transmission, and according to the configurable resource state of the serving cell and the SRS configuration recommendation information, the serving cell determines that the actually configured SRS time domain type is aperiodic transmission and determines the time domain position of the aperiodically transmitted SRS in a period of time.

At S405, the serving cell transmits location response information to the LMF server, where the location response information at least includes the SRS configuration determination information.

At S406, the LMF server receives the location response information transmitted by the serving cell.

At S407, the LMF server transmits measurement request information to a TRP, where the measurement request information includes the SRS configuration determination information.

At S408, the TRP receives the measurement request information transmitted by the LMF server.

At S409, the serving cell activates the aperiodically transmitted SRS.

At S410, the TRP performs SRS detection at the time domain position of the aperiodically transmitted SRS.

Figure 5:
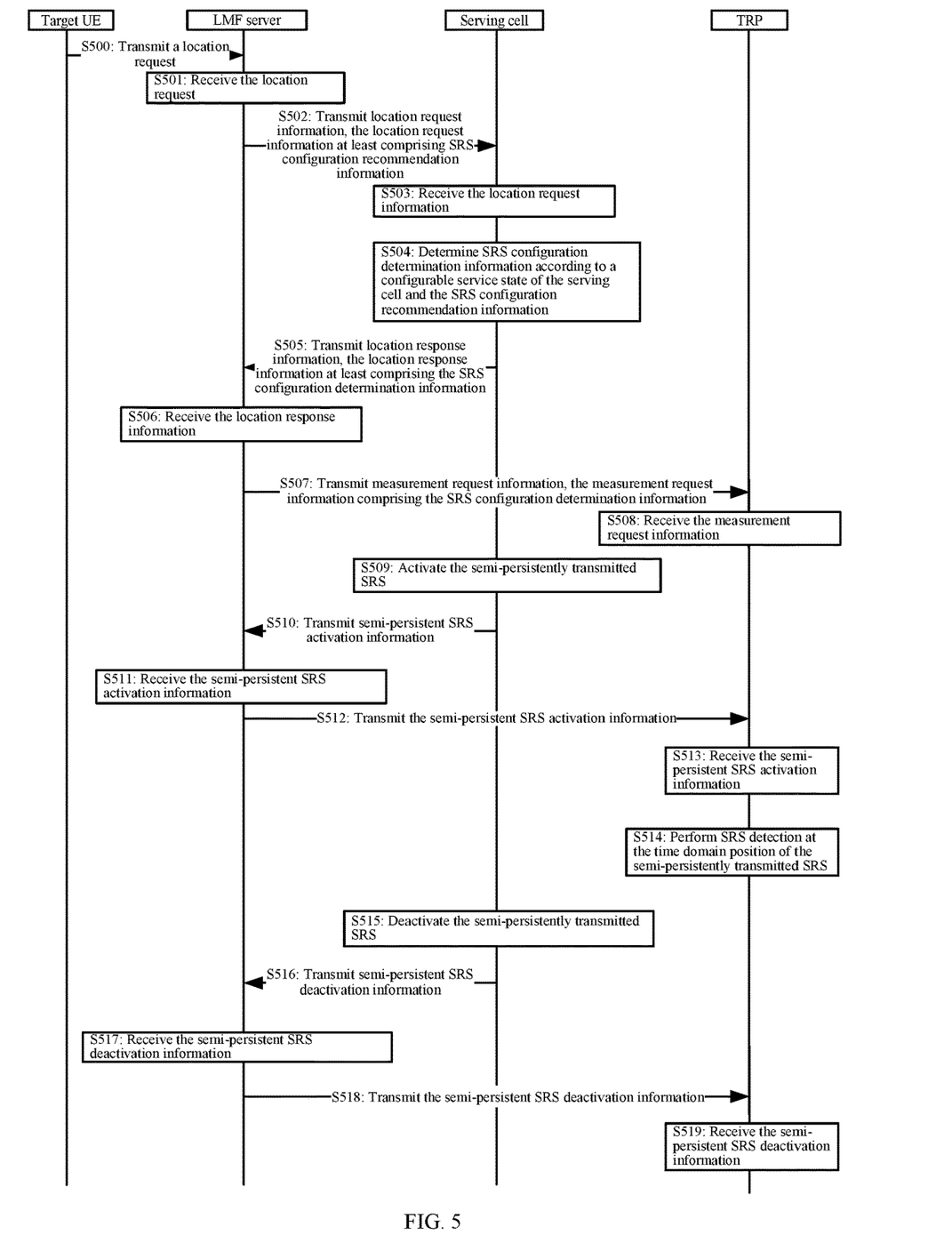
FIG. 5 is an interaction flowchart of still another method for processing location information according to an embodiment.

In yet another implementation, the actually configured SRS time domain type is semi-persistent transmission. FIG. 5 is an interaction flowchart of still another method for processing location information according to an embodiment. As shown in FIG. 5, the method includes steps S500 to S514.

At S500, a target UE transmits a location request to an LMF server.

At S501, the LMF server receives the location request transmitted by the target UE.

At S502, the LMF server transmits location request information to a serving cell of the target UE (hereafter referred to as the serving cell), where the location request information at least includes SRS configuration recommendation information.

The SRS configuration recommendation information may be obtained by the LMF server according to the location request of the target UE.

At S503, the serving cell receives the location request information transmitted by the LMF server.

At S504, the serving cell determines SRS configuration determination information according to a configurable resource state of the serving cell and the SRS configuration recommendation information.

As an example, the recommended SRS time domain type is aperiodic transmission, and according to the configurable resource state of the serving cell and the SRS configuration recommendation information the serving cell determines that the actually configured SRS time domain type is semi-persistent transmission and determines the time domain position of the semi-persistently transmitted SRS in a period of time.

At S505, the serving cell transmits location response information to the LMF server, where the location response information at least includes the SRS configuration determination information.

At S506, the LMF server receives the location response information transmitted by the serving cell.

At S507, the LMF server transmits measurement request information to a TRP, where the measurement request information includes the SRS configuration determination information.

At S508, the TRP receives the measurement request information transmitted by the LMF server.

At S509, the serving cell activates the semi-persistently transmitted SRS.

At S510, the serving cell transmits semi-persistent SRS activation information to the LMF server.

At S511, the LMF server receives the semi-persistent SRS activation information transmitted by the serving cell.

At S512, the LMF server transmits the semi-persistent SRS activation information to the TRP.

At S513, the TRP receives the semi-persistent SRS activation information transmitted by the LMF server.

At S514, the TRP performs SRS detection at the time domain position of the semi-persistently transmitted SRS.

Alternatively, the interaction process may further include steps S515 to S519.

At S515, the serving cell deactivates the semi-persistently transmitted SRS.

At S516, the serving cell transmits semi-persistent SRS deactivation information to the LMF server.

At S517, the LMF server receives the semi-persistent SRS deactivation information transmitted by the serving cell.

At S518, the LMF server transmits the semi-persistent SRS deactivation information to the TRP.

At S519, the TRP receives the semi-persistent SRS deactivation information transmitted by the LMF server.

In this way, the TRP stops SRS detection at the corresponding position.

Figure 6:
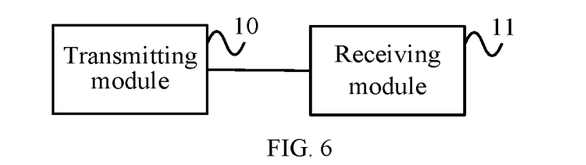
FIG. 6 is a schematic structural diagram of an apparatus for processing location information according to an embodiment.

FIG. 6 is a schematic structural diagram of an apparatus for processing location information according to an embodiment. The apparatus for processing location information may be configured in an LMF server. As shown in FIG. 6, the apparatus includes a transmitting module 10 and a receiving module 11.

The transmitting module 10 is configured to transmit location request information to a serving cell of a terminal device, the location request information at least including SRS configuration recommendation information. The receiving module 11 is configured to receive location response information transmitted by the serving cell, the location response information at least including SRS configuration determination information. The transmitting module 10 is further configured to transmit measurement request information to a TRP, the measurement request information including the SRS configuration determination information.

The apparatus for processing location information in this embodiment implements the method for processing location information in the embodiment shown in FIG. 1, and the implementation principle and technical effects of the apparatus for processing location information in this embodiment are similar to those of the above embodiment and will not be repeated here.

In an embodiment, the SRS configuration recommendation information includes at least one of a recommended SRS configuration type, a recommended SRS time domain type, a recommended SRS minimum bandwidth, a recommended SRS frequency domain position, a recommended SRS period, a recommended SRS scramble ID, a recommended SRS transmission comb size, a recommended SRS cyclic shift, and a recommended SRS transmission port number.

In an embodiment, the SRS configuration determination information includes at least one of an actually configured SRS configuration type, an actually configured SRS time domain type, an actually configured SRS bandwidth, an actually configured SRS frequency domain position, an actually configured SRS time domain position, an actually configured SRS period, an actually configured SRS scramble ID, an actually configured SRS transmission comb size, an actually configured SRS cyclic shift, and an actually configured SRS transmission port number.

In an embodiment, the SRS configuration determination information is identical to the SRS configuration recommendation information, or the SRS configuration determination information is different from the SRS configuration recommendation information.

In an embodiment, when the actually configured SRS time domain type is periodic transmission, the transmitting module 10 is configured to transmit the measurement request information to the TRP, so that the TRP performs SRS detection at a fixed position.

In an embodiment, when the actually configured SRS time domain type is aperiodic transmission, the transmitting module 10 is configured to transmit the measurement request information to the TRP, so that the TRP performs SRS detection at the time domain position of the aperiodically transmitted SRS.

In an embodiment, when the actually configured SRS time domain type is semi-periodically transmitted, the transmitting module 10 is configured to transmit the measurement request information to the TRP; the receiving module 11 is configured to receive semi-persistent SRS activation information transmitted by the serving cell; and, the transmitting module 10 is configured to transmit the semi-persistent SRS activation information to the TRP, so that the TRP performs SRS detection at the time domain position of the semi-persistently transmitted SRS.

In an embodiment, the receiving module 11 is further configured to receive semi-persistent SRS deactivation information transmitted by the serving cell. The transmitting module 10 is further configured to transmit the semi-persistent SRS deactivation information to the TRP.

Figure 7:
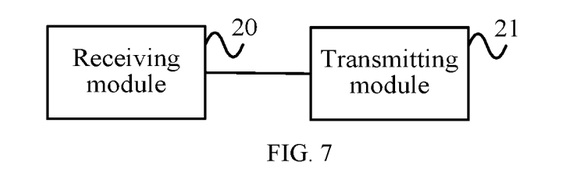
FIG. 7 is a schematic structural diagram of another apparatus for processing location information according to an embodiment.

FIG. 7 is a schematic structural diagram of another apparatus for processing location information according to an embodiment. The apparatus for processing location information may be configured in a serving cell/base station/node. As shown in FIG. 7, the apparatus includes a receiving module 20 and a transmitting module 21.

The receiving module 20 is configured to receive location request information transmitted by an LMF server, the location request information at least including SRS configuration recommendation information. The transmitting module 21 is configured to transmit location response information to the LMF server, the location response information at least including SRS configuration determination information.

The apparatus for processing location information in this embodiment implements the method for processing location information in the embodiment shown in FIG. 2, and the implementation principle and technical effects of the apparatus for processing location information in this embodiment are similar to those of the above embodiment and will not be repeated here.

Figure 8:
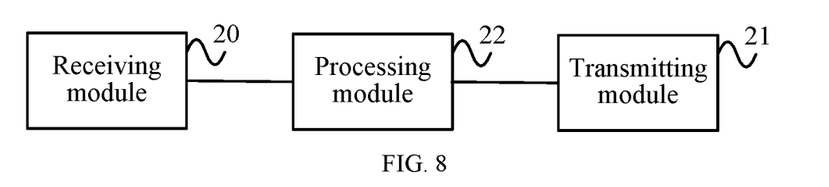
FIG. 8 is a schematic structural diagram of still another apparatus for processing location information according to an embodiment.

In an embodiment, in combination with FIG. 7, FIG. 8 is a schematic structural diagram of still another apparatus for processing location information according to an embodiment. As shown in FIG. 8, the apparatus includes: a processing module 22 configured to determine the SRS configuration determination information according to a configurable resource state and the SRS configuration recommendation information.

In an embodiment, the SRS configuration recommendation information includes at least one of a recommended SRS configuration type, a recommended SRS time domain type, a recommended SRS minimum bandwidth, a recommended SRS frequency domain position, a recommended SRS period, a recommended SRS scramble ID, a recommended SRS transmission comb size, a recommended SRS cyclic shift, and a recommended SRS transmission port number.

In an embodiment, the SRS configuration determination information includes at least one of an actually configured SRS configuration type, an actually configured SRS time domain type, an actually configured SRS bandwidth, an actually configured SRS frequency domain position, an actually configured SRS time domain position, an actually configured SRS period, an actually configured SRS scramble ID, an actually configured SRS transmission comb size, an actually configured SRS cyclic shift, and an actually configured SRS transmission port number.

In an embodiment, the SRS configuration determination information is identical to the SRS configuration recommendation information, or the SRS configuration determination information is different from the SRS configuration recommendation information.

In an embodiment, when the actually configured SRS time domain type is aperiodic transmission, the processing module 22 is further configured to activate the aperiodically transmitted SRS.

In an embodiment, when the actually configured SRS time domain type is semi-persistent transmission, the processing module 22 is further configured to activate the semi-persistently transmitted SRS, and the transmitting module 21 is further configured to transmit semi-persistent SRS activation information to the LMF server.

In an embodiment, the processing module 22 is further configured to deactivate the semi-persistently transmitted SRS. The transmitting module 21 is further configured to transmit semi-persistent SRS deactivation information to the LMF server.

According to an embodiment of the present disclosure, further provided is an apparatus for processing location information, including: a processor configured to perform the method provided in any one of the embodiments of the present disclosure when executing computer programs. The apparatus for processing location information may be the LMF server provided in any one of the embodiments of the present disclosure, or may be the serving cell/base station/node provided in any one of the embodiments of the present disclosure, or may be the TRP provided in any one of the embodiments of the present disclosure, which is not limited in the present disclosure.

Figure 9:
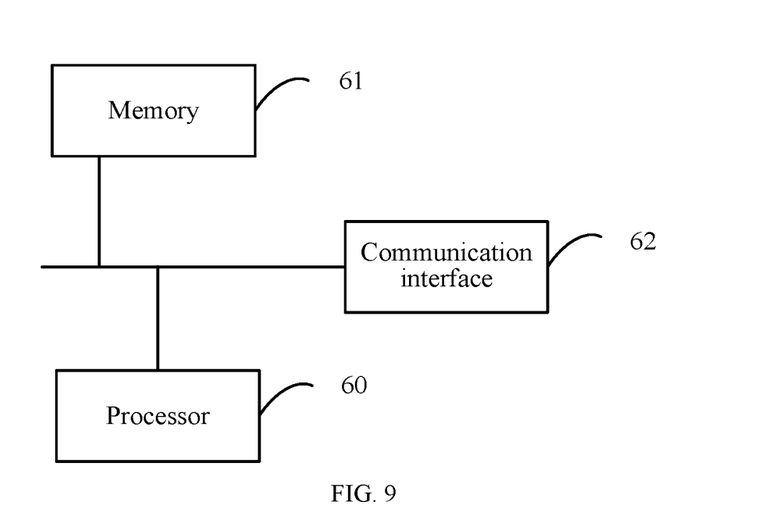
FIG. 9 is a schematic structural diagram of a base station according to an embodiment.

As an example, a schematic structural diagram of a base station serving as an apparatus for processing location information is provided in the following embodiment.

FIG. 9 is a schematic structural diagram of a base station according to an embodiment. As shown in FIG. 9, the base station includes a processor 60, a memory 61 and a communication interface 62. There may be one or more processors 60 in the base station, but FIG. 9 is illustrated by taking one processor 60 as an example. The processor 60, the memory 61 and the communication interface 62 in the base station may be connected via a bus or in other ways, but FIG. 9 is illustrated by taking the processor, the memory and the communication interface being connected via a bus as an example. The bus refers to one or more of multiple bus structures, including memory buses or memory controllers, peripheral buses, graphic acceleration ports, processors or local area buses using any one of multiple bus structures.

As a computer-readable storage medium, the memory 61 may be configured to store software programs, computer-executable programs and modules, for example, program instructions/modules corresponding to the method in the embodiments of the present disclosure. The software programs, instructions and modules stored in the memory 61, when executed by the processor 60, cause the processor 60 to execute at least one functional application and data processing of the base station, so as to implement the method for processing location information described above.

The memory 61 may include a program storage region and a data storage region. The program storage region may store application programs required by an operating system and at least one function, and the data storage region may store data created according to the use of the terminal, etc. In addition, the memory 61 may include high-speed random access memories, or may include non-volatile memories, for example, at least one magnetic disk memory device, a flash memory device or other non-volatile solid-state memory devices. In some instances, the memory 61 may include memories remotely arranged relative to the processor 60. These remote memories may be connected to the base station via a network. Examples of the network include, but not limited to, Internet, Intranet, local area networks, mobile communication networks and combinations thereof.

The communication interface 62 may be configured to receive and transmit data.

An embodiment of the present disclosure further provides a computer-readable storage medium storing computer programs which, when executed by a processor, cause the processor to carry out the method provided in any one of the embodiments of the present disclosure.

The computer storage medium in the embodiment of the present disclosure may be any combination of one or more computer-readable mediums. The computer-readable medium may be computer-readable signal mediums or computer-readable storage mediums. For example, the computer-readable storage medium may be, but not limited to, electrical, magnetic, optical, electromagnetic, infrared or semiconductor systems, apparatuses or devices, or any combination thereof. The computer-readable storage medium includes (a non-exhaustive list): electric connections having one or more leads, portable computer disks, hard disks, random access memories (RAMs), read-only memories (ROMs), erasable programmable read-only memories (EPROMs), flash memories, optical fibers, portable compact disc read-only memories (CD-ROMs), optical storage devices, magnetic storage devices or any suitable combination thereof. In the present disclosure, the computer-readable storage medium may be any tangible medium containing or storing programs. The programs may be used by or in conjunction with an instruction execution system, an apparatus or a device.

The computer-readable signal medium may include data signals propagated in basebands or as part of carriers, in which computer-readable program codes are carried. The propagated data signals may be in various forms, including but not limited to electromagnetic signals, optical signals or any suitable combination thereof. The computer-readable signal medium may also be any computer-readable medium in addition to computer-readable storage mediums. The computer-readable medium may send, propagate or transmit programs used by or in conjunction with an instruction execution system, apparatus or device.

The program codes contained in the computer-readable medium may be transmitted by any suitable medium, including but not limited to: wireless, wires, optical cables, radial frequency (RF) or the like, or any suitable combination thereof.

The computer program codes for executing the operations in the present disclosure may be written in one or more programming languages or a combination of programming languages. The programming languages include object-oriented programming languages such as Java, Smalltalk, C++, Ruby and Go, and may further include conventional procedural programming languages such as "C" language or similar programming languages. The program codes may be executed entirely on the user's computer, or executed partly on the user's computer, or executed as a stand-alone software package, or executed partly on the user's computer and partly on a remote computer, or executed entirely on a remote computer or server. In a scenario involving the remote computer, the remote computer may be connected to the user's computer through any type of networks, including a local area network (LAN) or a wide area network (WAN), or may be connected to an external computer (for example, through the Internet using an Internet service provider).

The term "user terminal" encompasses any suitable type of wireless user equipment, for example, mobile phones, portable data processing apparatuses, portable web browsers or vehicle-mounted mobile stations.

Generally, various embodiments of the present disclosure may be implemented in hardware or dedicated circuits, software, logics or any combinations thereof. For example, some aspects may be implemented in hardware, while other aspects may be implemented in firmware or software that can be executed by a controller, a microprocessor or other computing apparatuses, although the present disclosure is not limited thereto.

The embodiments of the present disclosure may be implemented by executing computer program instructions by a data processor of a mobile device, for example, in a processor entity, or by hardware, or by a combination of software and hardware. The computer program instructions may be assembly instructions, instruction set architecture (ISA) instructions, machine instructions, machine-related instructions, microcodes, firmware instructions, status setup data, or source codes or target codes written in any combination of one or more programming languages.

The blocks of any logic flow in the accompanying drawings of the present disclosure may represent program steps, or may represent interconnected logic circuits, modules and functions, or may represent combinations of program steps and logic circuits, modules or functions. The computer programs may be stored on a memory. The memory may be of any type suitable for the local technical environment and may be implemented by any suitable data storage technology, for example, but not limited to, read only memories (ROMs), random access memories (RAMs), optical memory devices and systems (digital versatile discs (DVDs) or compact disks (CDs)), etc. The computer-readable medium may include non-transient storage mediums. The data processor may be of any type suitable for the local technical environment, for example, but not limited to, general purpose computers, special purpose computers, microprocessors, digital signal processors (DSPs), application specific integrated circuits (ASICs), field-programmable gate arrays (FGPAs), and processors based on a multi-core processor architecture.

The invention claimed is:

1. A method for processing location information, which is performed by a location management function (LMF) server, the method comprising:
    transmitting, by the LMF server, location request information to a serving cell of a terminal device, the location request information at least comprising sounding reference signal (SRS) configuration recommendation information; wherein, the SRS configuration recommendation information is obtained by the LMF server according to the location request of the terminal device;
    receiving, by the LMF server, location response information transmitted by the serving cell, the location response information at least comprising SRS configuration determination information; and
    transmitting, by the LMF server, measurement request information to a transmission receive point (TRP), the measurement request information comprising the SRS configuration determination information; wherein, the SRS configuration determination information is determined by the serving cell, according to a configurable resource state of the serving cell and the SRS configuration recommendation information.

2. The method of claim 1, wherein the SRS configuration recommendation information comprises at least one of
    a recommended SRS configuration type,
    a recommended SRS time domain type,
    a recommended SRS minimum bandwidth,
    a recommended SRS frequency domain position,
    a recommended SRS period,
    a recommended SRS scramble identifier (ID),
    a recommended SRS transmission comb size,
    a recommended SRS cyclic shift, and
    a recommended SRS transmission port number.

3. The method of claim 1, wherein the SRS configuration determination information comprises at least one of
    an actually configured SRS configuration type,
    an actually configured SRS time domain type,
    an actually configured SRS bandwidth,
    an actually configured SRS frequency domain position,
    an actually configured SRS time domain position,
    an actually configured SRS period,
    an actually configured SRS scramble ID,
    an actually configured SRS transmission comb size,
    an actually configured SRS cyclic shift, and
    an actually configured SRS transmission port number.

4. The method of claim 3, wherein, in response to the actually configured SRS time domain type comprised in the SRS configuration determination information being periodic transmission, the transmitting, by the LMF server, measurement request information to a TRP comprises:
  transmitting, by the LMF server, the measurement request information to the TRP, so that the TRP performs SRS detection at a fixed position.

5. The method of claim 3, wherein, in response to the actually configured SRS time domain type comprised in the SRS configuration determination information being aperiodic transmission, the transmitting, by the LMF server, measurement request information to a TRP comprises:
  transmitting, by the LMF server, the measurement request information to the TRP, so that the TRP performs SRS detection at the time domain position of the aperiodically transmitted SRS.

6. The method of claim 3, wherein, in response to the actually configured SRS time domain type comprised in the SRS configuration determination information being semi-persistent transmission, the transmitting, by the LMF server, measurement request information to a TRP comprises:
  transmitting, by the LMF server, the measurement request information to the TRP;
  receiving, by the LMF server, semi-persistent SRS activation information transmitted by the serving cell; and
  transmitting, by the LMF server, the semi-persistent SRS activation information to the TRP, so that the TRP performs SRS detection at the time domain position of the semi-persistently transmitted SRS.

7. The method of claim 6, further comprising:
  receiving, by the LMF server, semi-persistent SRS deactivation information transmitted by the serving cell; and
  transmitting, by the LMF server, the semi-persistent SRS deactivation information to the TRP.

8. The method of claim 1, wherein the SRS configuration determination information is identical to the SRS configuration recommendation information, or
  the SRS configuration determination information is different from the SRS configuration recommendation information.

9. An apparatus for processing location information, comprising:
  a processor configured to perform the method for processing location information of claim 1 when executing computer programs.

10. A non-transitory computer-readable storage medium storing computer programs which, when executed by a processor, cause the processor to perform the method for processing location information of claim 1.

11. A method for processing location information, which is performed by a serving cell of a terminal device, the method comprising:
  receiving, by the serving cell, location request information transmitted by an LMF server, the location request information at least comprising SRS configuration recommendation information, wherein the SRS configuration recommendation information is obtained by the LMF server according to the location request of the terminal device; and
  transmitting, by the serving cell, location response information to the LMF server, the location response information at least comprising SRS configuration determination information; wherein, the SRS configuration determination information is determined by the serving cell, according to a configurable resource state of the serving cell and the SRS configuration recommendation information.

12. The method of claim 11, wherein the SRS configuration recommendation information comprises at least one of
  a recommended SRS configuration type,
  a recommended SRS time domain type,
  a recommended SRS minimum bandwidth,
  a recommended SRS frequency domain position,
  a recommended SRS period,
  a recommended SRS scramble ID,
  a recommended SRS transmission comb size,
  a recommended SRS cyclic shift, and
  a recommended SRS transmission port number.

13. The method of claim 11, wherein the SRS configuration determination information comprises at least one of
  an actually configured SRS configuration type,
  an actually configured SRS time domain type,
  an actually configured SRS bandwidth,
  an actually configured SRS frequency domain position,
  an actually configured SRS time domain position,
  an actually configured SRS period,
  an actually configured SRS scramble ID,
  an actually configured SRS transmission comb size,
  an actually configured SRS cyclic shift,
  and an actually configured SRS transmission port number.

14. The method of claim 13, wherein, in response to the actually configured SRS time domain type comprised in the SRS configuration determination information being aperiodic transmission, the method further comprises:
  activating, by the serving cell, the aperiodically transmitted SRS.

15. The method of claim 13, wherein, in response to the actually configured SRS time domain type comprised in the SRS configuration determination information being semi-persistent transmission, the method further comprises:
  activating, by the serving cell, the semi-persistently transmitted SRS, and transmitting semi-persistent SRS activation information to the LMF server.

16. The method of 15, after the activating, by the serving cell, the semi-persistently transmitted SRS, further comprising:
  deactivating, by the serving cell, the semi-persistently transmitted SRS, and transmitting semi-persistent SRS deactivation information to the LMF server.

17. The method of claim 11, wherein the SRS configuration determination information is identical to the SRS configuration recommendation information,
  or the SRS configuration determination information is different from the SRS configuration recommendation information.

18. An apparatus for processing location information, comprising:
  a processor configured to perform the method for processing location information of claim 11 when executing computer programs.

19. A non-transitory computer-readable storage medium storing computer programs which, when executed by a processor, cause the processor to perform the method for processing location information of claim 11.

* * * * *